United States Patent
Kakiuchi et al.

(10) Patent No.: US 8,159,601 B2
(45) Date of Patent: Apr. 17, 2012

(54) SEQUENTIAL SHOOTING CONTROLLER

(75) Inventors: Shinichi Kakiuchi, Saitama (JP); Yutaka Ohsawa, Tokyo (JP); Shigeru Iwamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 400 days.

(21) Appl. No.: 12/562,388

(22) Filed: Sep. 18, 2009

(65) Prior Publication Data

US 2010/0073553 A1  Mar. 25, 2010

(30) Foreign Application Priority Data

Sep. 19, 2008  (JP) ................................. 2008-240863

(51) Int. Cl.
  *H04N 5/225*  (2006.01)
  *H04N 7/18*  (2006.01)
  *G03B 7/26*  (2006.01)
  *H02J 7/00*  (2006.01)

(52) U.S. Cl. ........ 348/372; 348/157; 396/277; 396/301; 320/106

(58) Field of Classification Search .................. 348/372, 348/157, 222.1; 396/277–279, 301; 320/106
See application file for complete search history.

(56) References Cited

U.S. PATENT DOCUMENTS

| 6,134,391 | A | * | 10/2000 | Takahashi ..................... 396/277 |
| 2004/0246841 | A1 | * | 12/2004 | Miyamoto ................. 369/47.28 |
| 2005/0046392 | A1 | * | 3/2005 | Yamada et al. ............... 320/149 |
| 2005/0146640 | A1 | * | 7/2005 | Shibata ......................... 348/372 |
| 2005/0265165 | A1 | * | 12/2005 | Kitagaki et al. ............. 369/47.5 |
| 2006/0291848 | A1 | | 12/2006 | Takahashi et al. |

FOREIGN PATENT DOCUMENTS

JP  3215710  7/2001

* cited by examiner

*Primary Examiner* — Nhan T Tran
*Assistant Examiner* — Mekonnen Dagnew
(74) *Attorney, Agent, or Firm* — Greenblum & Bernstein, P.L.C.

(57) ABSTRACT

A sequential shooting controller includes both high and low load drive modes, and first and second power-voltage detectors. The high/low load drive modes drive a device under high/low loads. The first power-voltage detector detects a power-voltage by connecting a load. The second power-voltage detector detects the voltage across the device. The first power-voltage detector is actuated at the beginning of sequential shooting before a first image capturing operation starts. The high load image capturing operation starts when the voltage detected by the first power-voltage detector is higher than a first threshold. The low load image capturing operation starts when the voltage detected by the first power-voltage detector is lower than the first threshold. The second power-voltage detector is driven during a high load image capturing operation. The second power-voltage detector is disabled during a low load image capturing operation.

12 Claims, 7 Drawing Sheets

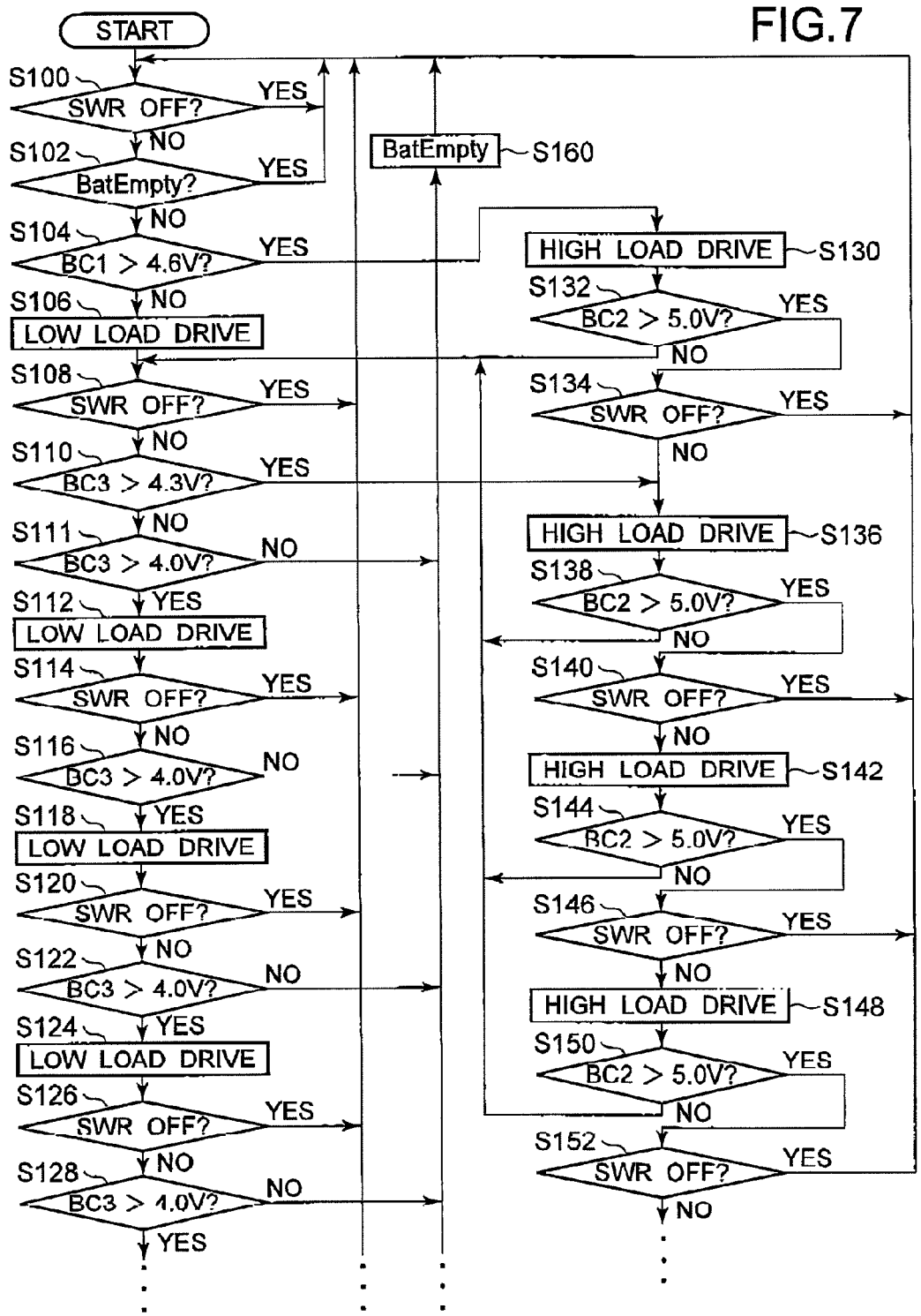

SEQUENTIAL SHOOTING CONTROLLER

BACKGROUND OF THE INVENTION

1. Field of the Invention

The present invention relates to a sequential shooting control operation of a camera, and particularly to a sequential shooting controller that drives the sequential shooting with reference to a battery charge level.

2. Description of the Related Art

A large variety of electric and electronic devices are equipped in a camera to fulfill various functions, and these devices are usually powered by a battery. As for some of the functions, it may be better for the level of the battery charge to be checked in advance. In particular, as for a large power-consuming device, it is beneficial to check the battery charge level directly before its activation in order to avoid unexpected suspension during operation.

In general, a predetermined electrical load is applied on the battery to check the battery charge level before actuating a requested function. Namely, the property of the battery charge level is determined from the voltage across the electrical load. Furthermore, in order to improve the accuracy of the battery charge level determination, Japanese Patent No. 3215710 discloses a device that selects different sizes of electric loads that are adapted to the electric power requirements of different operations.

SUMMARY OF THE INVENTION

However, the internal impedances of chemical batteries are high and the output voltage of the batteries recovers as a condition with no load continues. Therefore, the conventional battery-charge checking procedure would lead to a misjudgment, such that the battery has sufficient energy charge even though actual chemical potential energy has already been expended. This is because the generation of electric charges in the chemical batteries owes to chemical reactions that take place in the battery. Namely, the batteries can supply an electric charge sufficient for a load requirement when enough material for the chemical reactions exists, so that a decline in the output voltage is substantially due to resistance of terminals or electrodes only. However, when the material for the chemical reaction decreases, the electric charge supply cannot meet the demand, and thereby, although the required voltage may be output at the beginning of an operation, the output voltage rapidly declines before long. Therefore, when the battery charge level is checked in the conventional manner, the battery charge level could be determined to be sufficient from the output voltage detected at the time of the testing, and thus the operation of a certain function may be carried out. However, the output voltage may rapidly decline and cause the operation to be suspended before completion.

In order to prevent the above-mentioned misjudgment, a high threshold voltage may be chosen for the battery-charge checking procedure. However, this may prohibit the operation from being carried out even when there remains enough energy to operate the desired function. Furthermore, when sequential shooting is requested, the battery-charge checking procedure, which applies a load on the battery, is carried out immediately before each image capturing operation, which is disadvantageous for a high-speed sequential shooting.

An object of the present invention is to provide a sequential shooting control device that is able to maintain a high-speed sequential shooting as long as possible when a sequential shooting mode is selected.

According to the present invention, a sequential shooting controller is provided that includes a high load drive mode, a low load drive mode, a first power-voltage detector, and a second power-voltage detector.

The high load drive mode drives a device used in an image capturing operation under a relatively high load condition. The low load drive mode drives a device under a relatively low load condition. The first power-voltage detector detects the voltage of an electric power source by connecting a load for monitoring the voltage of electric power. The second power-voltage detector detects the voltage of the electric power source by monitoring the voltage applied to the device. The first power-voltage detector is actuated before a first image capturing operation commences in a sequential shooting, which consists of continuous, sequential image capturing operations. The image capturing operation under the high load drive mode commences when the voltage of the power source detected by the first power-voltage detector is higher than a first threshold value, whereas an image capturing operation under the low load drive mode commences when the voltage of the power source detected by the first power-voltage detector is lower than the first threshold value. Furthermore, the second power-voltage detector is driven while an image capturing operation is carried out under the high load drive mode, in contrast to the second power-voltage detector being disabled while an image capturing operation is carried out under the low load drive mode.

BRIEF DESCRIPTION OF THE DRAWINGS

The objects and advantages of the present invention will be better understood from the following description, with reference to the accompanying drawings in which:

FIG. 7 is a flowchart of a sequential image capturing operation control in the sequential shooting.

DESCRIPTION OF THE PREFERRED EMBODIMENTS

Figure 1:
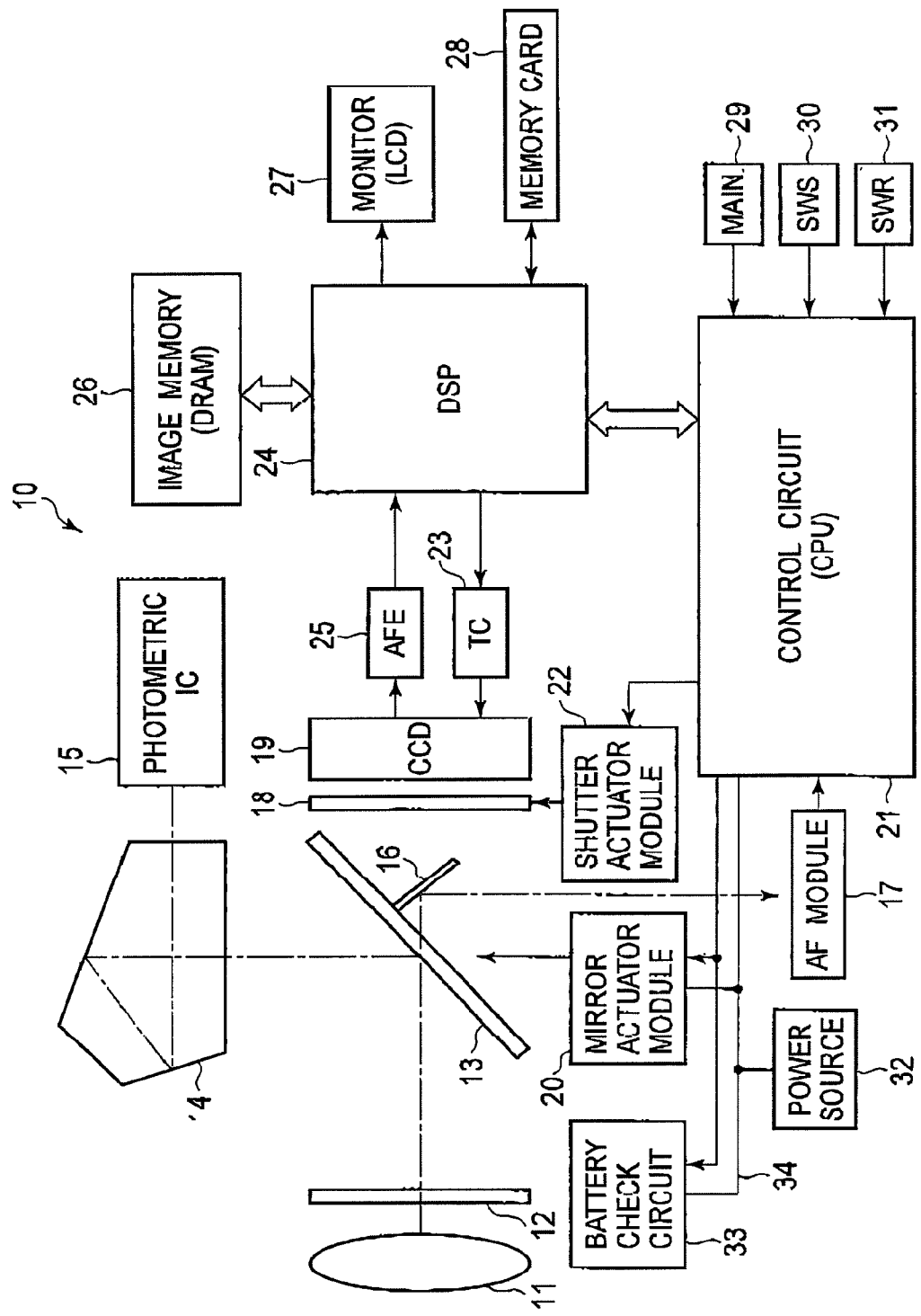
FIG. 1 is a block diagram showing the general structures of a camera provided with a sequential shooting control device of an embodiment to which the present invention is applied.

The present invention is described below with reference to the embodiments shown in the drawings.

FIG. 1 is a block diagram Showing the general structures of a camera provided with a sequential shooting control device of an embodiment to which the present invention is applied. In the present embodiment, although a digital single reflex camera is described as an example, the invention can be applied to any type of a camera if the sequential shooting functionality is provided.

The digital single reflex camera 10 is mounted with a lens-barrel having a photographic lens 11 and an aperture stop 12, where light enters the camera body through the photographic lens 11 and the aperture stop 12. A reflex mirror 13 at a 45-degree angle with respect to the optical axis of the photographic lens n is arranged inside the camera body, and light rays reflected by the reflex mirror 13 are directed toward a focusing screen (not shown) and a pentagonal prism 14. The light rays are further reflected toward an eyepiece and some of the light lays are led to a photometric IC 15 for light metering. A part of the reflex mirror 13 is configured as a half-silvered mirror (a beam splitter) so that light rays that have passed through the beam splitter portion are reflected by a sub mirror 16 attached to the reflex mirror 13 and made incident into an auto focus (AF) module 17.

Behind the reflex mirror 13, a mechanical shutter 18 is disposed. Further, behind the mechanical shutter 18, an imaging sensor 19, such as a CCD, is arranged. The reflex mirror 13 and the sub mirror 16 are driven by an electric motor provided in a mirror actuator module 20, which is controlled by a control circuit (CPU) 21. Furthermore, the mechanical shutter 18 is driven by an electric motor provided in a shutter actuator module 22, which is controlled by the control circuit 21.

The CCD 19 is connected to a digital signal processor (DSP) 24 via a timing controller (TC) 23. The DSP 24 drives the timing controller (TC) 23 according to instructions from the control circuit 21 to control the CCD 19. Image signals detected by the CCD 19 are converted into digital signals through an analog front-end (AFE) processor 25 and input to the DSP 24. Furthermore, the digital image signals are temporally stored in image memory (DRAM) 26 while they are subjected to predetermined image processing in the DSP 24 and displayed on a monitor (LCD) 27. The image data are stored in a recording medium, such as a memory card 28 and the like, if required.

The control circuit 21 is connected with a main switch (MAIN) 29, a photometry switch (SWS) 30, and a release switch (SWR) 31. When the main switch 29 is turned ON, the electric power from an electric power source (i.e. a battery) 32 is supplied to each of the devices in the lens-barrel and the camera body. Furthermore, when the release button (not shown) is depressed halfway to turn ON the photometry switch (SWS) 30, the control circuit 21 carries out a photometric process according to signals from the photometric IC 15, and thus, the aperture stop 12 is actuated. An autofocus process is also carried out according to signals from the AF module 17 and the photographic lens 11 is actuated.

Moreover, when the release button (not shown) is fully depressed, the mirror actuator module 20 is activated and rapidly rotates the reflex mirror 13 upward, and the shutter actuator module 22 is actuated and the mechanical shutter 1S in driven. Synchronously, the CCD 19 is driven to capture an object image.

A battery-check circuit 33 (a first power source voltage detector) is connected to a power line 34, which is led from the electric power source 32, in parallel with the mirror actuator module 20. The battery-check circuit 33 is actuated at a predetermined time according to instructions from the control circuit 21. In FIG. 1 only the relationship of the power system between the mirror actuator module 20, the control circuit 21, the electric power source 32, the battery-check circuit 33, and the power line 34 is shown. However, the electric power source 32 is connected through the power line 34 to every device provided in the camera body and the lens-barrel in order to supply electric power to each device.

Figure 2:
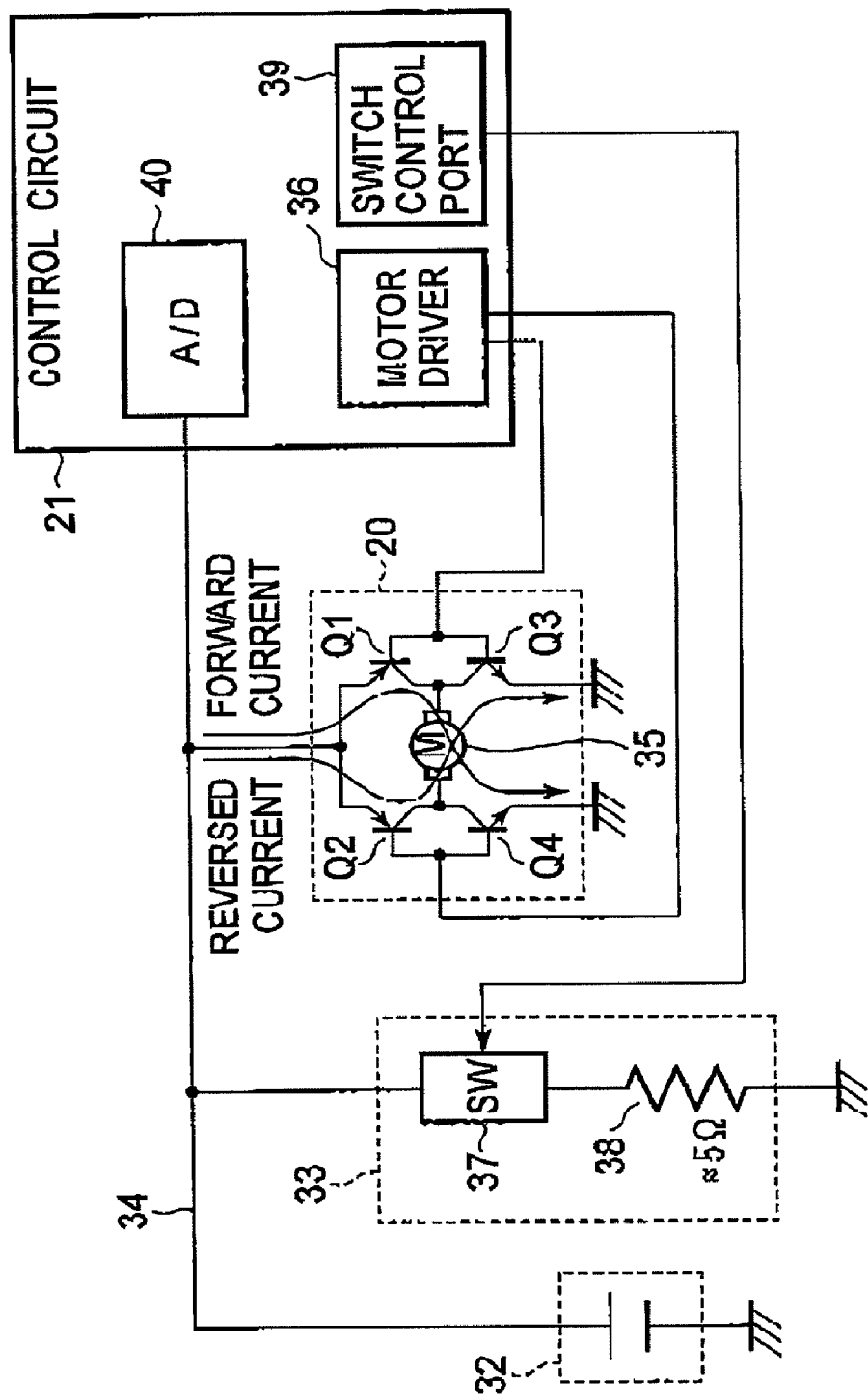
FIG. 2 is an electric schematic illustrating the relationship between a mirror actuator module, a control circuit (CPU), an electric power source, a battery-check circuit, and a power line.

FIG. 2 is an electric schematic illustrating the relationship between the mirror actuator module 20, the control circuit (CPU) 21, the electric power source 32, the battery-check circuit, and the power line 34. For the electric power source 32, a chemical battery, such as a lithium battery, an alkaline battery, or the like, is employed. The negative terminal of the battery(s) 33 is grounded and the positive terminal is connected to the power line 34.

The mirror actuator module 20 includes an electric motor 35 to actuate the reflex mirror 13, and the electric motor 35 is driven forward or reversed using an H-bridge circuit. Namely, when only transistors Q1 and Q4 are turned ON at the same time, current from the power line 34 flows across the transistor Q1, the motor 35, and the transistor Q4, so that the motor 35 rotates in the forward direction. On the other hand, when only transistors Q2 and Q3 are turned ON at the same time, the current from the power line 34 flows across the transistor Q2, the motor 35, and the transistor Q3, so that the motor 35 rotates in reverse. The ON/OFF states of the transistors Q1-Q4 are controlled by a motor driver 36 of the control circuit 21. Incidentally, if only the transistors Q3 and Q4 are turned ON at the same time, it functions as brake applied on the motor 35.

The battery-check circuit 33 is comprised of a switch 37 and an electric load resistor 38 of around five ohms, for example. Namely, one terminal of the load resistor 38, which is exclusively used to check the battery charge level, is connected to the switch 37 and the other terminal is connected to the ground. When the switch 37 is turned ON, the current flows across the load resistor 38, which is connected to the power line 34, from the power line to the ground. The ON/OFF state of the switch 37 is controlled by a signal from a switch control port 39 of the control circuit 21.

As shown in FIG. 2, the mirror actuator module 20 and the battery-check circuit 33 are connected to the power line 34 in parallel. Further, the power line 34 is connected to an A/D input port 40 of the control circuit 21. Namely, the voltage of the power line 34 is converted into digital signals at the A/D input port 40 and input to the control circuit 21.

Figure 3:
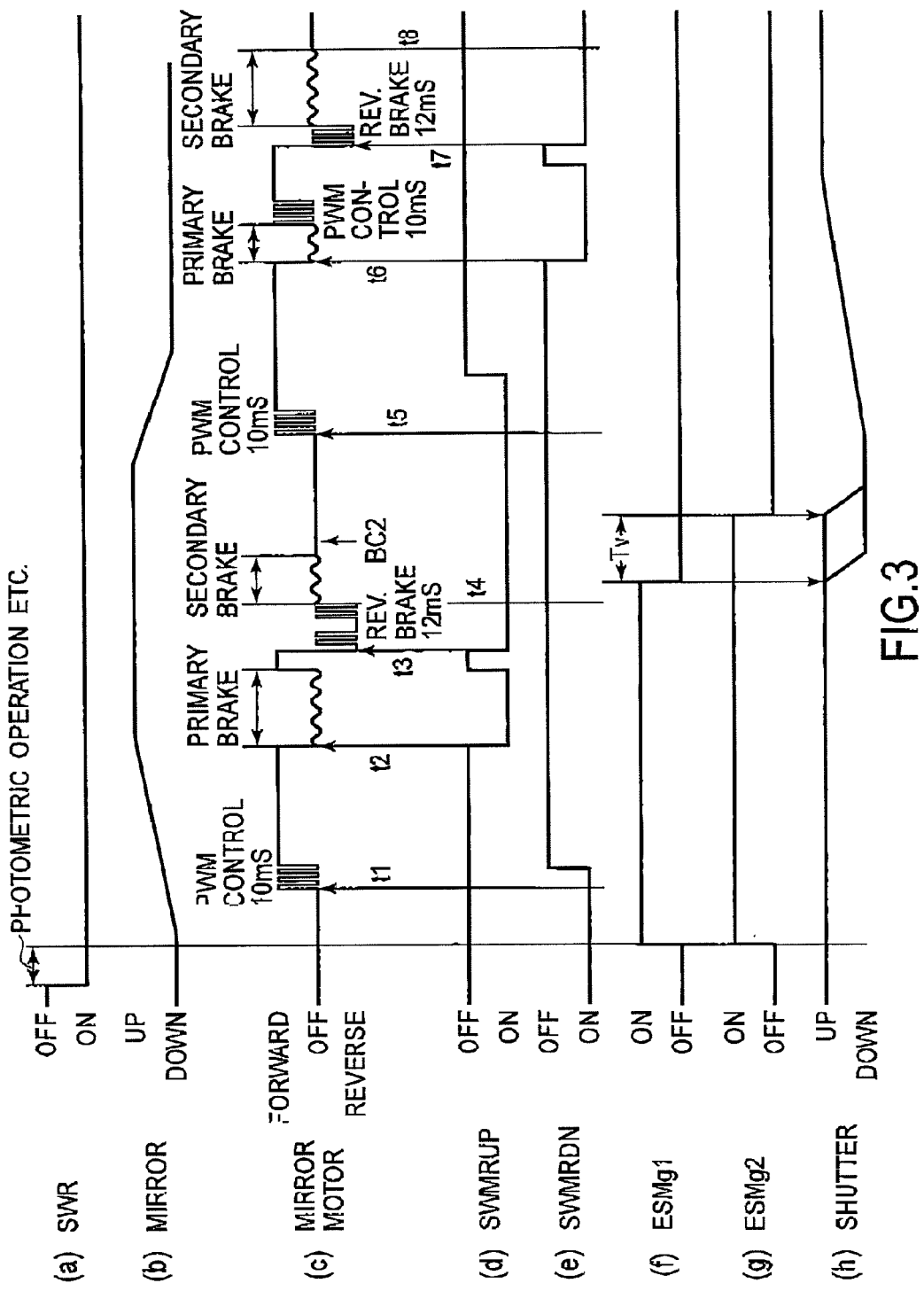
FIG. 3 is a timing chart of a high load drive mode.
Figure 4:
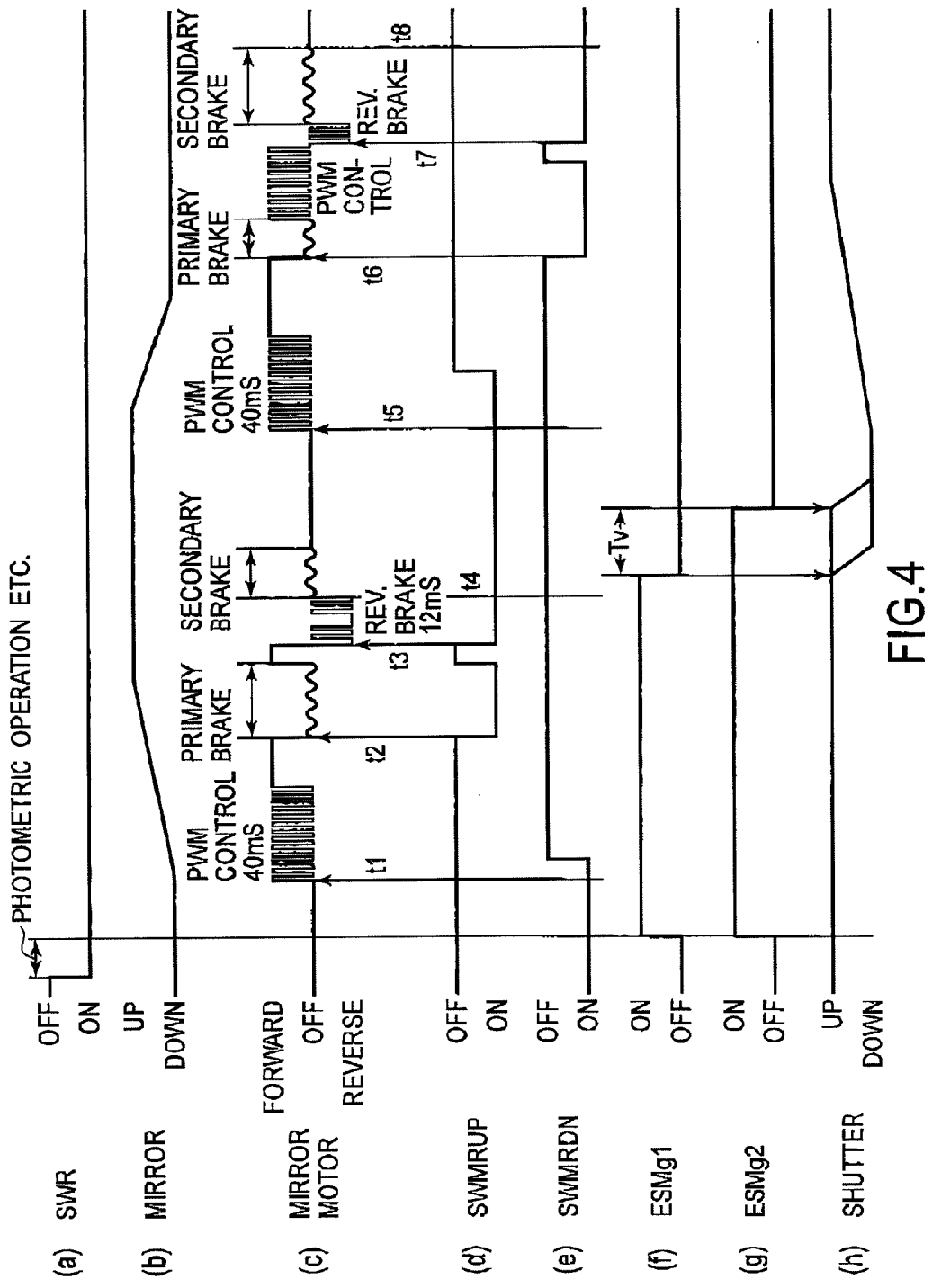
FIG. 4 is a timing chart of the low load drive mode.

With reference to FIGS. 3 and 4, two different types of driving mode for actuating the motor 35 are explained for one image capturing operation. In the present embodiment, two modes for actuating the reflex mirror 13 are provided. One is a high load drive mode where the motor 35 is driven in a way that consumes a relatively large amount of electric power and the other is a low load drive mode where the motor 35 is driven in a way that consumes a relatively small amount of electric power. FIGS. 3 and 4 are timing charts that show the operational sequences for the reflex mirror 13, the motor 35, and the mechanical shutter 18 in the respective modes. FIG. 3 corresponds to the timing chart of the high load drive mode and FIG. 4 corresponds to the timing chart of the low load drive mode.

In FIGS. 3 and 4, chart (a) indicates the ON/OFF states of the release switch 31, and chart (b) indicates the position of the reflex mirror 13. Further, chart (c) indicates forward/reverse/OFF states of the electric motor 35 for the reflex mirror, and charts (d) and (e) indicate the ON/OFF states of a mirror-up switch (SWMRUP) and a mirror-down switch (SWMRDN), the switches that detect the up position and down position of the reflex mirror 13. Note that the mirror actuating mechanism rotates the reflex mirror 13 upward when the motor 35 is driven forward and rotates the reflex mirror 13 downward when the motor 35 is driven in reverse. The mirror up switch (SWMRUP) and the mirror-down switch (SWMRDN) are turned ON or turned OFF by a brush mechanism provided on the rotational components of the motor 35 and used to detect the position of the reflex mirror 13. Furthermore, charts (f) and (g) indicate the ON/OFF states of shutter magnets ESMg1 and ESMg2, which control operations of the front curtain and rear curtain of the mechanical shutter (a focal-plane shutter) 18. Chart (h) indicates slide (up/down) operations of the front and rear curtains of the mechanical shutter 18 controlled by the ON/OFF state of the shutter magnets ESMg1 and ESMg2. Hare, an interval Tv represents the exposure time.

As shown in FIGS. 3 and 4, in both the high load drive mode and the low load drive mode, the motor 35 is controlled by a pulse wave modulation (PWM) at the beginning of the mirror-up operation and the mirror-down operation. However, the PWM control duration in the high load drive mode is relatively short when it is compared to the PWM control duration in the low load drive mode. For example, in the high load drive mode, the PWM control is carried out at the beginning of both the mirror-up rotating operation and mirror-down rotating operation for approximately 10 milliseconds, but in the low load drive mode it is carried out for approximately 40 milliseconds. During the PWM control, the output of current is controlled by a program so that the electric power consumption can be restrained by restricting the current flow supplied to the motor. However, the shorter the period restraining the current flow supplied to the motor, the higher the torque of the motor and thus the higher the rotational acceleration. Therefore, the mirror-up and mirror-down operations carried out in the high load drive mode are quicker than those carried out in the low load drive mode, so that the high load drive mode enables a high-speed drive at the cost of a large electric power consumption. Note that the time scale represented in the abscissa in FIG. 3 and FIG. 4 is different.

In the high load drive mode of FIG. 3, the motor 35 is rotated forward under the PWM control for about 10 milliseconds from a point t1, and after that the current is continuously supplied to the motor 35, so that the reflex mirror 13 rotates up to the mirror-up position. The electric current supplied to the motor 35 is stopped at a point t2, immediately before the reflex mirror 13 reaches the mirror-up position, and a primary brake is applied. The motor 35 is then instantaneously reactivated (point t3) and rotated forward to urge the reflex mirror 13 to a stopper (s) to prevent the effects of a bounce. Immediately after that, a reversal brake is applied under the PWM control for a predetermined period, 12 milliseconds for example. Further, the electric power supply to the motor 35 is stopped (point t4), and a secondary brake is applied for a predetermined period. Due to the secondary braking operation, the reflex mirror 13 is stably positioned in the mirror-up position. During the secondary braking operation, the mechanical shutter 18 is opened for the exposure time Tv, while the reflex mirror 13 is being positioned in the mirror-up position.

When it reaches a point t5, which corresponds to the completion of the exposure time Tv, the motor 35 is again rotated forward for about 10 milliseconds, for example, under the PWM control whereby the reflex mirror 13 rotates downward to the mirror-down position. When the reflex mirror 13 reaches the mirror-down position, the electric power supply to the motor 35 is stopped and the primary brake for the rotate-down operation is applied (point t6). After that, the motor 35 is rotated forward for about 10 milliseconds, for example, under the PWM control, and then the electric power is continuously supplied to the motor 35 to rotate forward for a predetermined time. Furthermore, after the reversal brake is applied (point t7) for a predetermined time, the secondary brake in the rotate-down operation is applied for a predetermined time, and then, the motor 35 is stopped, which completes the image capturing operation for a single shot in the high load drive mode.

On the other hand, in the low load drive mode of FIG. 4, the duration of the PWM control at the beginning of the mirror-up rotating operation and the mirror-down rotating operation is set longer than that of the high load drive mode (for example, four times longer or 40 milliseconds). In addition, the forward rotation immediately after the primary braking operation of the rotate-down operation is carried out under the PAM control only. However, the other motor control is carried out in the same manner as in the high load drive mode. Accordingly, although the low load drive mode requires more time to rotate the reflex mirror 13 up and down than is required in the high load drive mode, it can reduce the consumption of electric power.

Next, with reference to FIG. 2, FIG. 5, and FIG. 6, the operation of the motor 35 in the sequential shooting of the present embodiment will be explained. Note that in the present embodiment, a plurality of battery-charge checking operations and a plurality of threshold values are provided so that the battery-charge checking operations can be carried out at different times with respect to the high load drive mode and the low load drive mode in order to continue the high-speed sequential shooting and prevent an incorrect operation by adapting the operation to the battery consumption.

Figure 5:
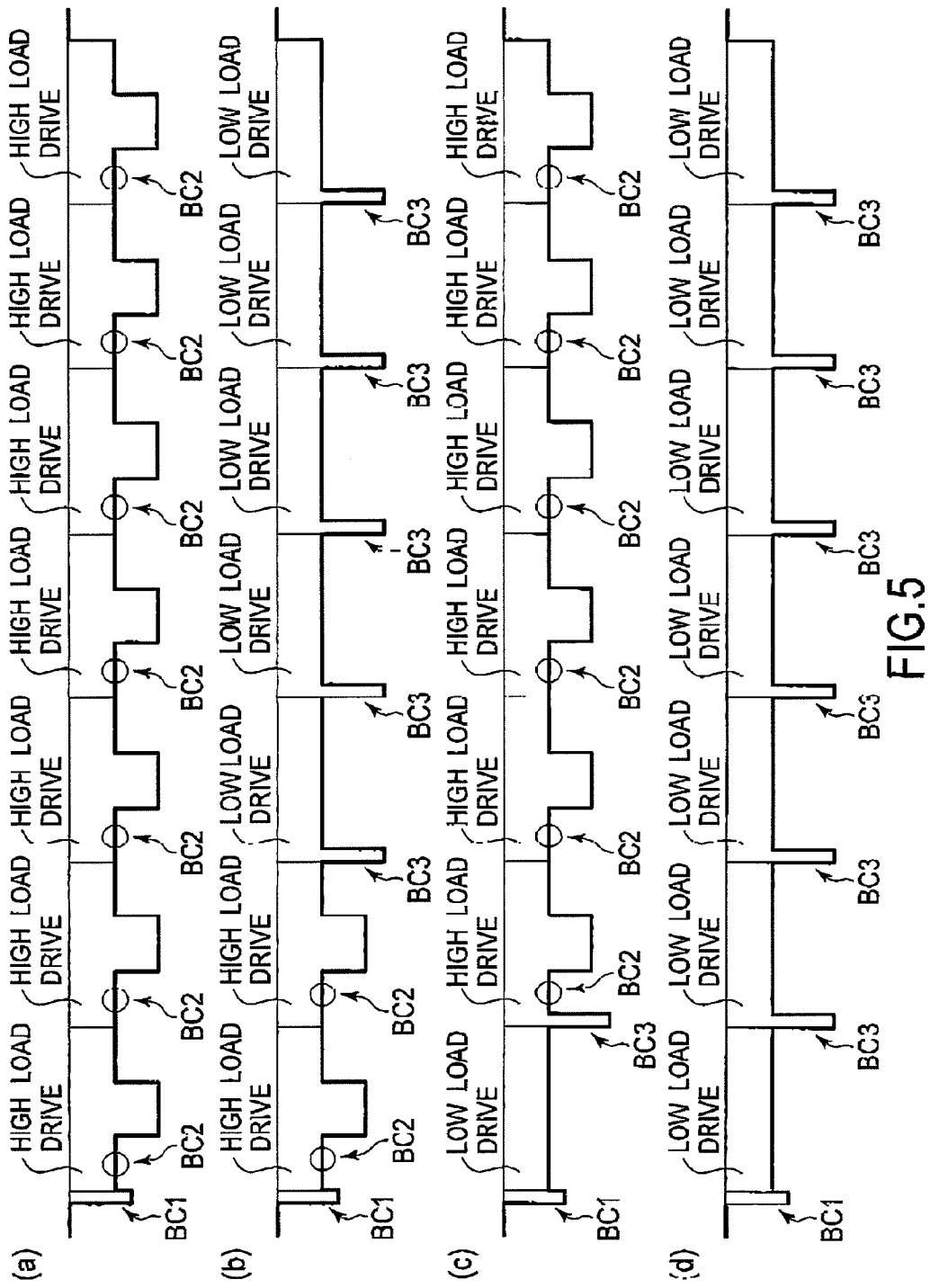
FIG. 5 shows timing charts or the battery-charge checking operations and sequence of operations of the motor.
Figure 6:
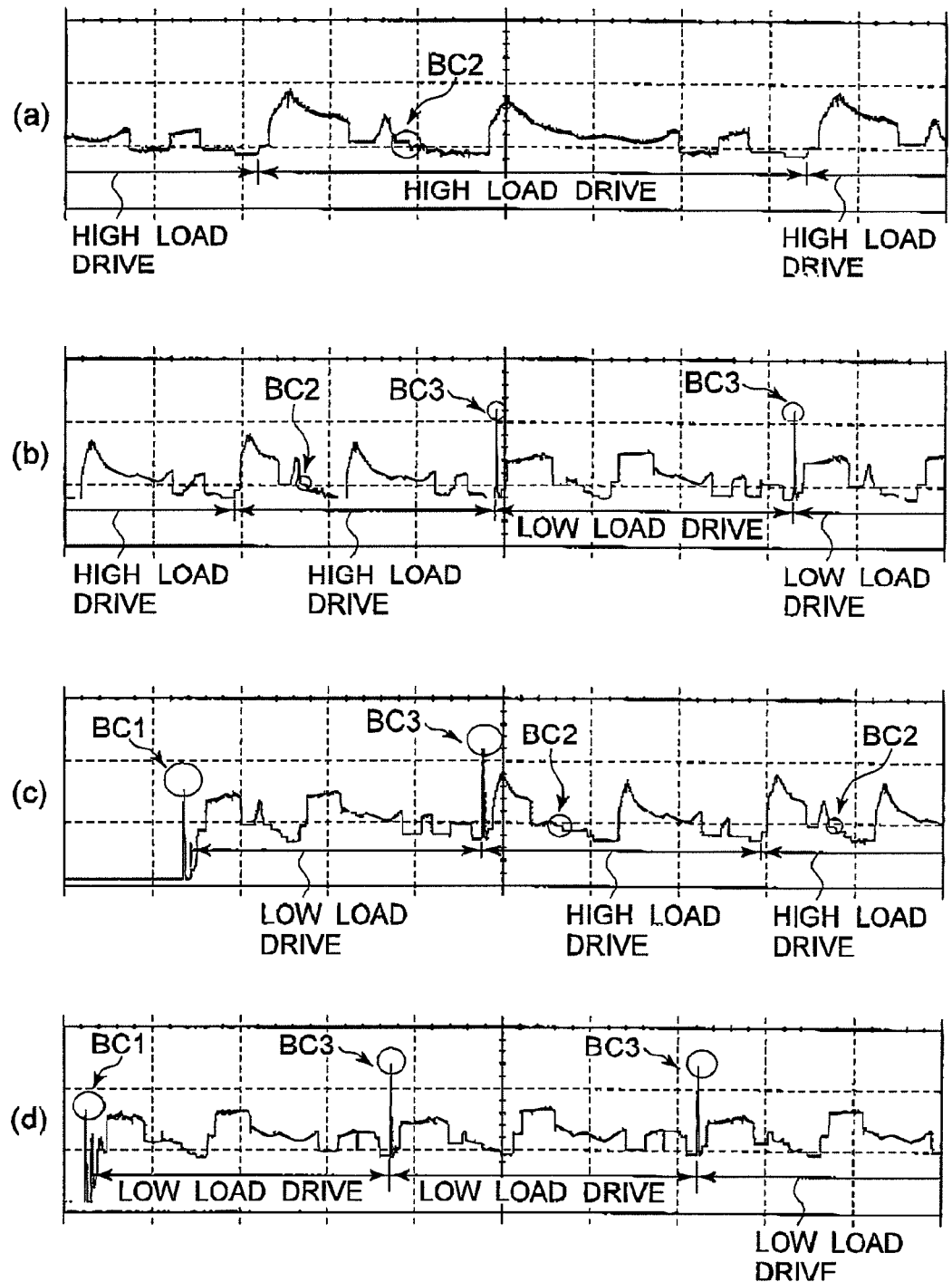
FIG. 6 represents actual variations in the electric current consumption corresponding to each of the timing charts indicated in FIG. 5.

FIG. 5 shows timing charts that schematically illustrate the timing of the battery-charge checking operations and the sequence of the operations of the motor 35, where the suitable modes are selected based on the result of the battery-charge checking operations. Note that in each timing chart, the abscissa represents time and the ordinate represents the voltage of the power line 34.

FIG. 5(a) represents a sequence of the motor drive when the battery charge level is sufficient enough to carry out the entire sequential shooting in the high load drive mode. FIG. 5(b) represents a sequence of the motor drive when the battery charge level is sufficient enough to begin the sequential shooting in the high load drive mode but subsequently declines to a level that cannot complete the sequential shooting in high load drive mode. FIG. 5(c) represents a sequence of the motor drive when the battery charge level is determined in the beginning to be insufficient for the high load drive mode when in fact it has a sufficient level to drive the high load drive mode. FIG. 5(d) represents a sequence of the motor drive when the battery charge level is actually insufficient to carry out the high load drive mode from the beginning of the sequential shooting operation. Note that in FIG. 5(a)-FIG. 5(d), the actual time scales in the high load drive mode and in the low load drive mode are different.

In the present embodiment, the battery charge level is checked by applying combinations of a first power-voltage detecting operation and a second power-voltage detecting operation, where the first power-voltage detecting operation determines the battery charge level by applying the voltage of the power source 32 across the electric load of the battery-check circuit 33 to detect the voltage of the power line 34, and the second power-voltage detecting operation determines the battery charge level by applying the voltage of the power source 32 across the electric load of the motor 35 to detect the voltage of the power line 34.

When the sequential shooting mode is selected and the release switch 31 is turned on, the first power-voltage detecting operation is carried out just after the release switch 31 is turned ON and immediately before the first image capturing operation is carried out (time BC1), see FIG. 5(a)-FIG. 5(d). Namely, the electric load of resistor 38 is applied to the power source 32 by turning the switch 37 ON while maintaining the motor 35 in the OFF state. Further, the voltage of the power line 34, at this moment, is input to the control circuit 21 as a digital value, through the Ai) input port 40.

When a voltage detected by the first power-voltage detecting operation carried out directly after the start of the sequential shooting mode is higher than a predetermined first threshold value (for example, 4.6V), the battery charge level is determined to be a charge level that is sufficient to drive the high load drive mode, and thus the sequential image capturing operation under the high load drive mode commences, see FIG. 5 (a) and FIG. 5(b). On the other hand, when a voltage detected by the first power-voltage detecting operation carried out directly after the start of the sequential shooting mode is equal to or less than the first threshold value, the battery charge level is determined to be a charge level that may be insufficient to drive the high load drive mode, but is sufficient to drive the low load drive mode, so that the sequential image-capturing operation under the low load drive mode commences (see FIG. 5(c) and FIG. 5(d)).

Note that the first power-voltage detecting operation, which is carried out at time BC1 in the beginning of the sequential shooting mode, is only used to determine whether to carry out the high load drive mode or the low load drive mode in the first image-capturing operation.

When the image capturing operations under the high load drive mode commence, the second power-voltage detecting operation is carried out during each of the image capturing operations under the high load drive mode, and a voltage of the power line 34 is input as a digital value to the control circuit 21 through the A/D input port 40. The second power-voltage detecting operation is carried out at predetermined time BC2 in each of the image capturing operations under the high load drive mode before a high electrical load is applied. For each of such high load drive mode operations, the first power-voltage detecting operation is not carried out. Namely, the switch 37 is maintained in the OFF state. The time BC2, which indicates the execution of the second power-voltage detecting operation, is chosen at a point where the voltage is relatively stable in the image capturing sequence, for example during the mirror-up rotation. More particularly, referring to FIG. 3, the time BC2 may be Immediately after the secondary braking operation of the mirror-up rotation, where the position of the reflex mirror 13 is stably at rest.

In the second power-voltage detecting operation, when the detected voltage is higher than a predetermined second threshold value (for example 5.0V), the battery charge level is determined to be the level that is sufficient to drive the high load drive. Therefore, the image capturing operation under the high load drive mode is continued in the succeeding image-capturing operation.

FIG. 5(a) represents a situation when the sequential shooting is started in the high load drive mode, and where the second power-voltage detecting operation carried out during every succeeding image capturing operation under the high load drive mode detected a voltage value higher than the second threshold value. In this situation, the image capturing operation under the high load drive mode continues until either the voltage in the second power-voltage detecting operation declines to the second threshold value, or less, and causes it to be switched to the low load drive mode, or the release switch 31 is switched to OFF state.

On the other hand, FIG. 5(b) represents the situation when the voltage detected by the second power-voltage detecting operation in the first image capturing operation under the high load drive mode is higher than the second threshold value, and thus the battery charge level is determined to be sufficient for the operation of the high load drive mode at that time, but the voltage then declines to the second threshold value or less in the second power-voltage detecting operation in the second image-capturing operation under the high load drive mode. When the voltage is equal to or less than the second threshold value, the battery charge level could be insufficient to capture an image under the high load drive mode. Therefore, the first power-voltage detecting operation, which applies the battery-check circuit 33, is further carried out at the beginning of the next image capturing operation (time BC3 of FIG. 5(b)).

This first power-voltage detecting operation is carried out immediately after the start of the image capturing operation while the electric power is supplied to the motor 35. Namely, at the time BC3 (at the beginning of the image capturing operation) of FIG. 5, the switch 37 of the battery-check circuit 33 is turned ON so that the voltage of the power line 34 is also applied to the electric load resistor 38. At this point, if the voltage is higher than a third threshold value (e.g., 4.3V), the battery charge level is determined to be sufficient to drive the high load drive mode and the succeeding image capturing operation is carried out in the high load drive mode.

On the other, hand, when the detected voltage is equal to or less than the third threshold value, the battery charge level is determined to be insufficient for the high load drive mode, and thus the succeeding image capturing operations are carried out in the low load drive mode. Note that in each one of the low load drive modes that is carried out after the drive mode is changed from the high load drive mode to the low load drive mode, the first power-voltage detecting operation is carried out at the beginning of each image capturing operation and the detected voltages are compared with a predetermined fourth threshold value (e.g., 4.0V). Once the voltage is determined to be lower than the third threshold value (4.3V), it may be preferable to continue the image capturing operations under the low load drive mode instead of the high load drive mode, even if a voltage higher than the third threshold value (4.3V) is detected, since the chemical potential energy of the battery merely decreases while the output voltage of the battery varies with respect to the values of the load current. Further, the second power-voltage detecting operation is also not carried out in this situation.

When the voltage is higher than the fourth threshold value, the sequential shooting under the low load drive mode is continued until the release switch 31 is switched OFF. Furthermore, when the voltage decrease to the fourth threshold value or less, image capturing terminates and the user is informed of the low condition of the battery charge level, either visually (e.g., a symbol displayed on a monitor) or by sound (e.g., an alert).

In the motor drive sequence of FIG. 5(b), sequential shooting commences under the high load drive mode, and in the second power-voltage detecting operation during the second image capturing operation under the high load drive mode, the voltage is determined to be lower than the second threshold value. Further, the detected voltage in the first power-voltage detecting operation carried out at the beginning of the third image-capturing operation is lower than the third threshold value, and the voltage detected in the first power-voltage detecting operation carried out in each of the succeeding image capturing operations under the low load drive mode is higher than the fourth threshold value.

Both of the motor drive sequences in FIG. 5(c) and FIG. 5(d) represent situations when the voltage detected by the first power-voltage detecting operation, which is carried out at the time BC1 in the beginning of the sequential shooting mode, is lower than the first threshold value. When the voltage is lower than the first threshold value during the battery-charge level checking at the time BC1, it is determined that the voltage charge level may be insufficient for the image capturing operation under the high load drive mode, and thus the sequential shooting commences with the image capturing operation under the low load drive mode. When the image capturing operation commences under the low load drive mode, the first power-voltage detecting operation is carried out at the time BC3 at the beginning of the next image-capturing operation.

The motor drive sequence in FIG. 5(c) illustrates the situation when the voltage detected in the first power-voltage detecting operation immediately after the first image capturing operation under the low load drive mode is higher than the third threshold value, such that the second image capturing operation is switched to the high load drive mode. In this case, as well as FIG. 5(a) and FIG. 5(b), the second power-voltage detecting operation is carried out at the time BC2. Note that if the voltage detected in subsequent second power-voltage detecting operations is higher than the second threshold value, the image capturing operation under the high load drive mode is continued until the release 31 is switched OFF. Further, when the voltage detected by the second power-voltage detecting process is lower than the second threshold value, the image-capturing operation is again switched back to the low load drive mode.

The motor drive sequence in FIG. 5(d) illustrates the situation when the voltage detected in the first power-voltage detecting operation immediately after the first image capturing operation under the low load drive mode is lower than the third threshold value. After such voltage detection, only image capturing operations under the low load drive mode are repeated, as well as the continuation of image capturing after the third image capturing operation in FIG. 5(b). Namely, image capturing under the low load drive mode is continued until the first power-voltage detecting operation in each of the low load drive operations decreases to less than the fourth threshold value or the release switch 31 is switched OFF. Note that when the voltage of the power line 34 falls below the fourth threshold value at any of the power-voltage detecting operations under the low load drive mode, the continuation of image capturing is terminated and a warning is issued with respect to either a power source deficiency or a low battery charge level. When the voltage detected in the first power-voltage detecting operation immediately after the first image-capturing operation under the low load drive mode is lower than the fourth threshold value, a warning is immediately issued with respect to the deficiency of the power source.

The graphs of FIG. 6(a)-FIG. 6(d) represent part of the actual variations of the electric current consumption corresponding to FIG. 5(a)-FIG. 5(d). In each graph, the times BC1, BC2, and BC3 are indicated. In FIG. 6 the ordinate represents the value of the electric current and the abscissa represents time, but note that the time scale is not identical among FIG. 6(a)-FIG. 6(d).

Next, with reference to the flowchart of FIG. 7, the sequential image capturing operation in the sequential shooting mode of the present embodiment will be explained. Note that the operations are controlled by the control circuit 21.

When the sequential shooting mode is selected, Step S100 is executed. In Step S100, it is determined whether or not the release switch (SWR) 31 is in the OFF state. If the release switch (SWR) 31 is in the OFF state, this determination is repeated. On the other hand, if the release switch (SWR) 31 is in the ON state, the process proceeds to Step S102 and a determination is made as to whether the flag BatEmpty, which indicates the state of the battery charge level, is true. If the flag BatEmpty is true, a warning is issued regarding the deficiency of the power source and the process returns to Step S100, where the above-mentioned determination is again repeated until the release switch (SWR) 31 is switched OFF.

When the flag BatEmpty is determined to be false in Step S102, the process proceeds to Step S104 and a switch 37 of the battery-check circuit 33 is turned ON so that the first power-voltage detecting operation (battery check) using only the load resistor 38 is carried out at the time BC1 to determine whether or not the detected voltage is higher than the first threshold value (4.6V).

If the voltage detected in Step S104 is greater than the first threshold value, the process proceeds to Step S 130 and the motor 35 is driven under the high load drive mode; however, if the voltage detected is equal to or less than the first threshold value, the process proceeds to Step S106 and the motor 35 is driven under the low load drive mode. After the motor 35 is driven under the low load drive mode in Step S106, the process proceeds to Step S108 and a determination is made as to whether or not the release switch (SWR) 31 is in the OFF state. In Step S108, when the release switch (SWR) 31 is in the OFF state the process returns to Step S100, otherwise the release switch (SWR) 31 is in ON state and the process proceeds to Step S110. In Step S110 the first power-voltage detecting operation is carried out at the time BC3 to detect the voltage of the power line 34, and thus determine whether or not the detected voltage is higher than the third threshold value (4.3V).

When the voltage detected in Step S110 is higher than the third threshold value, the process proceeds to Step S136 and the motor 37 is driven under the high load drive mode in Step S136 (detailed later). On the other hand, when the voltage detected in Step S110 is equal to or less than the third threshold value, whether or not the detected voltage is higher than the fourth threshold value (4.0V) is determined in Step S111. If the detected voltage is higher than the fourth threshold value, the motor 37 is driven under the low load drive mode in Step S112. On the other hand, if the detected voltage is equal to or less than the fourth threshold valise, the flag BatEmpty is set to true so that the warning process is executed. When the motor 37 is driven under the low load drive mode, the determination of the release switch (SWR) 31 is carried out in Step S114 as well as in Step S108. If the release switch (SWR) 31 is maintained in the ON state, the first power-voltage detecting operation is carried out at the next BC3 in Step S116 so that a determination can be made as to whether or not the detected voltage is higher than the fourth threshold value.

When the detected voltage is equal to or less than the fourth threshold value, the flag BatEmpty is set true in Step S160 so that the warning process is executed. On the other hand, when it is determined in Step S116 that the detected voltage is higher than the fourth threshold value, the motor 37 is driven under the low load drive mode in Step S118 and the processes of Steps S114-S118 are repeated (only corresponding Steps S120-S128 are indicated).

On the other hand, when the voltage detected in the first power-voltage detecting operation carried out in Step S104 at time BC1 (the operation that only uses the battery-check circuit 33) is higher than the first threshold value, and when the motor 37 is driven in the high load drive mode in step S130, the second power-voltage detecting operation is carried out at the time BC2 and a determination is made in Step S132 as to whether or not the detected voltage is higher than the second threshold value (5.0V).

When it is determined in step S132 that the detected voltage is equal to or less than the second threshold value, the process proceeds to Step S108 and the processes succeeding Step S108 are repeated. When the detected voltage is higher than the second threshold value, the process proceeds to Step S134 and a determination is made as to whether or not the release switch (SWR) 31 is in the OFF state. If the release switch (SWR) 31 is OFF state, the process returns to Step S100 and the above-mentioned processes are repeated; however, if it is ON state, the motor 37 is again driven under the high load drive mode in Step S136.

At the completion of the motor being driven under the high load drive mode, the same processes as Steps S132-S136 are repeated (Steps S138-S152 are indicated as an example).

As discussed above, according to the present embodiment, the first power-voltage detecting operation using the battery-check circuit, and the second power-voltage detecting operation, which detects the voltage of the power line when the device used in the image capturing operation, such as the mirror drive motor, is driven, are used in combination. Furthermore, the sequential image capturing operations under the high load drive mode and the low load drive mode are selectively carried out in combination according to determinations made with respect to a combination of a plurality of threshold values and the first and second power-voltage detecting operations. Thereby, the sequential image capturing operations in the sequential shooting can be continued for as long as possible at high speed.

Namely, according to the conditions of the sequential shooting, the high load drive mode and low load drive mode are suitably selected in order to continue the sequential image capturing for as long as possible, and the high speed sequential shooting is maintained by applying a simple battery-charge checking operation that does not use the battery-check circuit when the battery charge level is regarded as sufficient. Furthermore, even once the low load drive mode is selected, the image capturing operation after the second image capturing operation can be switched to the high load drive mode by checking the power voltage an comparing it with a lower threshold value. Thereby, even it the power voltage has declined to a low level at the beginning of the sequential shooting for whatever reason, the drive mode is still switched to the high load drive mode if the actual battery charge level is sufficient, so that the high speed sequential shooting is enabled. Furthermore, even when the sequential shooting is being carried out in the high load drive mode, the drive mode is switched to the low load drive mode when the battery charge level declines, so that the sequential image capturing operations can be continued for as long as possible.

Note that the numerical values specified in the present embodiment are only examples and do not intend to restrict the claimed inventions. Further, in the present embodiment, the third threshold value and the fourth threshold value are selected as 4.3V and 4.0v as an example, but the two values can be selected to be identical (for example, 4.0V).

Furthermore, a device other than the motor for actuating the reflex mirror (which requires a large electrical current to drive) that is driven under the high load mode in the sequential image capturing operation may be either a CCD driver in rapid discharge operation or an aperture stop driver. As for a low load device, the reflex mirror motor driven under the condition restricting the current may be the CCD driver in normal discharge operation, a memory driver, and so on. The above-listed devices may also be applied in the embodiment as a high load and low load for checking the battery charge level.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-240863 (filed on Sep. 19, 2008) which is expressly incorporated herein, by reference, in its entirety.

The invention claimed is:

1. A sequential shooting controller, comprising:
a high load drive mode that drives a device used in an image capturing operation under a relatively high load condition;
a low load drive mode that drives said device under a relatively low load condition;
a first power-voltage detector that detects a voltage of an electric power source by connecting a load for monitoring the voltage of said electric power; and
a second power-voltage detector that detects the voltage of said electric power source by monitoring the voltage applied to said device;
said first power-voltage detector being actuated in the beginning or sequential shooting, which continuously carries out sequential image capturing operations, before a first image capturing operation starts;
an image capturing operation under said high load drive mode being started when the voltage of said power source detected by said first power-voltage detector is higher than a first threshold value and an image capturing operation under said low load drive mode being started when the voltage of said power source detected by said first power-voltage detector is lower than said first threshold value; and
said second power-voltage detector being driven during an image capturing operation under said high load drive mode is carried out and said second power-voltage detector being disabled while an image capturing operation under said low load drive mode is carried out.

2. A sequential shooting controller according to claim 1, wherein the image capturing operation under said high load drive mode is continued when the voltage of said power source detected by said second power-voltage detector is higher than a second threshold value which is greater than said first threshold value.

3. A sequential shooting controller according to claim 2, wherein the drive mode of the image capturing operation is switched to said low load drive mode when the voltage of said power source detected by said second power-voltage detector is lower than said second threshold value.

4. A sequential shooting controller according to claim 3, wherein said first power-voltage detector is actuated after completion of the image capturing operation under said low load drive mode and at the beginning of a succeeding image capturing operation.

5. A sequential shooting controller according to claim 3, wherein said first power-voltage detector is actuated at the beginning of a succeeding image capturing operation when the voltage of said power source is lower than said second threshold value, and when the voltage of said power source detected thereby is higher than a third threshold value which is lower than said second threshold value, the image capturing operation under said high load drive mode is continued.

6. A sequential shooting controller according to claim 5, wherein the drive mode of the image capturing operation is switched to said high load drive mode when said sequential shooting is started under said low load drive mode and when the voltage of said power source detected by said first power-voltage detector actuated at the beginning of a succeeding image capturing operation is higher than said third threshold value.

7. A sequential shooting controller according to claim 5, wherein the image capturing operation under said low load drive mode is continued when the voltage of said power source detected by said first power-voltage detector actuated during an image capturing operation under said low load drive mode after R second image capturing operation in said sequential shooting is higher than said third threshold value or a fourth threshold value that is lower than said third threshold value.

8. A sequential shooting controller according to claim 5, wherein the image capturing operation is terminated when the voltage of said power source detected by said first power-voltage actuated during an image capturing operation under said low load drive mode after a second image capturing operation in said sequential shooting is lower than said fourth threshold value.

9. A sequential shooting controller according to claim 5, wherein only the image capturing operation under said low load drive mode is carried out when the voltage of said power source detected by said first power-voltage detector actuated during an image capturing operation under said low load drive mode after a second image capturing operation in said sequential shooting is lower than said third threshold value.

10. A sequential shooting controller according to claim 8, further comprising:

a warning processor that issues a warning with respect to a deficiency of said power source, said warning processor being actuated when the image capturing operation is terminated under conditions where the voltage of said power source detected by said first power-voltage detector actuated during an image capturing operation under said low load drive mode after a second image capturing operation in said sequential shooting is lower than said fourth threshold value.

11. A sequential shooting controller according to claim 1, wherein said device comprises a motor for actuating a reflex mirror.

12. A sequential shooting controller according to claim 11, wherein said second power-voltage detector is actuated during the rotation of said reflex mirror in a mirror-up position.

* * * * *